United States Patent
Hui Jung et al.

(10) Patent No.: US 9,853,496 B2
(45) Date of Patent: Dec. 26, 2017

(54) BACKUP POWER SUPPLY CONTROL

(71) Applicant: SCHNEIDER ELECTRIC IT CORPORATION, West Kingston, RI (US)

(72) Inventors: Chen Hui Jung, New Taipei (TW); Shen Chen-Jui, New Taipei (TW)

(73) Assignee: SCHNEIDER ELECTRIIC IT CORPORATION, West Kingston, RI (US)

( * ) Notice: Subject to any disclaimer, the term of this patent is extended or adjusted under 35 U.S.C. 154(b) by 378 days.

(21) Appl. No.: 14/648,158

(22) PCT Filed: Nov. 29, 2012

(86) PCT No.: PCT/US2012/067017
§ 371 (c)(1),
(2) Date: May 28, 2015

(87) PCT Pub. No.: WO2014/084830
PCT Pub. Date: Jun. 5, 2014

(65) Prior Publication Data
US 2015/0311750 A1    Oct. 29, 2015

(51) Int. Cl.
*H02J 9/06* (2006.01)
*H02J 7/00* (2006.01)

(52) U.S. Cl.
CPC ............ *H02J 9/061* (2013.01); *H02J 7/0068* (2013.01); *H02J 7/0077* (2013.01); *H02J 9/062* (2013.01); *H02J 2009/068* (2013.01)

(58) Field of Classification Search
CPC ......... H02J 9/061; H02J 7/0068; H02J 7/0077
USPC .............................................. 307/66
See application file for complete search history.

(56) References Cited

U.S. PATENT DOCUMENTS

| | | | |
|---|---|---|---|
| 4,506,318 A * | 3/1985 | Nilssen | H02M 7/53832 315/194 |
| 5,790,391 A | 8/1998 | Stich et al. | |
| 2006/0043792 A1 | 3/2006 | Hjort et al. | |
| 2010/0226051 A1 | 9/2010 | Nair et al. | |
| 2010/0271853 A1* | 10/2010 | Furutani | H02M 7/53875 363/132 |
| 2012/0181871 A1 | 7/2012 | Johansen et al. | |

(Continued)

OTHER PUBLICATIONS

Extended European Search Report from corresponding European Application No. 12889294.0 dated Jan. 19, 2016.
(Continued)

*Primary Examiner* — Jared Fureman
*Assistant Examiner* — Win Htun
(74) *Attorney, Agent, or Firm* — Lando & Anastasi, LLP

(57) ABSTRACT

According to one aspect, embodiments of the invention provide an uninterruptible power supply (UPS) system comprising an input configured to receive input AC power, an output configured to provide output AC power to a load, a DC power source coupled to a DC bus, an inverter having an input coupled to the DC bus and an output coupled to the output of the UPS system, the inverter configured to receive DC power at the input from the DC bus and provide AC power having a voltage to the output, and a controller coupled to the output of the inverter and configured to operate the inverter based on an average voltage of the AC power at the output of the inverter.

20 Claims, 2 Drawing Sheets

(56) References Cited

U.S. PATENT DOCUMENTS

2012/0248875 A1* 10/2012 Fang .................... H02M 7/42
                                                                307/66
2014/0062201 A1*  3/2014 Giuntini .......... G01R 19/16547
                                                                307/64

OTHER PUBLICATIONS

Notification of Transmittal of the International Search Report and the Written Opinion of the International Searching Authority from corresponding PCT/US2012/067017 dated Feb. 6, 2013.

* cited by examiner

BACKUP POWER SUPPLY CONTROL

This application is a U.S. National Stage Application under 35 U.S.C. §371 from International Application No. PCT/US2012/067017, filed Nov. 29, 2012, which is hereby incorporated by reference in its entirety for all purposes.

BACKGROUND OF INVENTION

Field of the Invention

At least one example in accordance with the present invention relates generally to the control of square wave power supplies.

Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs. Some off-line UPS's include a tap switching voltage regulation circuit to stabilize the output voltage continuously.

SUMMARY OF THE INVENTION

Aspects in accord with the present invention are directed to an uninterruptible power supply (UPS) system comprising an input configured to receive input AC power, an output configured to provide output AC power to a load, a DC power source coupled to a DC bus, an inverter having an input coupled to the DC bus and an output coupled to the output of the UPS system, the inverter configured to receive DC power at the input from the DC bus and provide AC power having a voltage to the output, and a controller coupled to the output of the inverter and configured to operate the inverter based on an average voltage of the AC power at the output of the inverter.

According to one embodiment, the controller is further configured to: compare the average voltage of the AC power at the output of the inverter with a predetermined average output voltage threshold value, and control the AC power at the output of the inverter based on the comparison of the calculated average voltage to the average output voltage threshold. In one embodiment, the controller is further configured to clamp the voltage at the output of the inverter to zero in response to a determination that the calculated average voltage is at least equal to the average output voltage threshold.

According to another embodiment, the controller is further configured to calculate, based on the output voltage, an RMS voltage of the AC power at the output of the inverter, compare the RMS voltage of the AC power at the output of the inverter with a predetermined RMS output voltage threshold value, and control the AC power at the output of the inverter based on the comparison of the calculated RMS voltage to the RMS output voltage threshold. In one embodiment, the controller is further configured to clamp the voltage at the output of the inverter to zero in response to a determination that the calculated RMS voltage is at least equal to the RMS output voltage threshold.

According to one embodiment, the controller includes a pulse width modulation controller coupled to the inverter and wherein the controller is further configured to control the AC power at the output of the inverter using the pulse width modulation controller. In one embodiment, the AC power provided at the output by the inverter comprises a square wave and wherein the controller is further configured to control a pulse width of the square wave based on an average voltage at the output of the inverter calculated by the controller.

According to another embodiment, the UPS system is configured as an off-line UPS. In another embodiment, the UPS system is configured as a line-interactive UPS.

Another aspect in accord with the present invention is directed to a method for controlling an inverter having an output configured to provide AC power, the method comprising sampling an output voltage of the AC power at the output of the inverter over a period of time, calculating an average output voltage of the inverter over the period of time, comparing the calculated average output voltage of the inverter to a predetermined average output threshold value, determining whether the calculated average output voltage is at least equal to the predetermined average output threshold value, and controlling the AC power at the output of the inverter based on the act of determining whether the calculated average output voltage is at least equal to the predetermined average output threshold value.

According to one embodiment, controlling the AC power at the output of the inverter based on the act of determining whether the calculated average output voltage is at least equal to the predetermined average output threshold value includes clamping the output voltage at the output of the inverter to zero in response to a determination that the calculated average output voltage is at least equal to the predetermined average output threshold value.

According to another embodiment, the method further comprises calculating an RMS output voltage of the inverter over the period of time, comparing the calculated RMS output voltage of the inverter to a predetermined RMS output threshold value, determining whether the calculated RMS output voltage is at least equal to the predetermined RMS output threshold value, and controlling the AC power at the output of the inverter based on the act of determining whether the calculated RMS output voltage is at least equal to the predetermined RMS output threshold value.

According to one embodiment, controlling the AC power at the output of the inverter based on the act of determining whether the calculated RMS output voltage is at least equal to the predetermined RMS output threshold value includes clamping the output voltage at the output of the inverter to zero in response to a determination that the calculated RMS output voltage is at least equal to the predetermined RMS output threshold value.

According to another embodiment, controlling the inverter includes controlling the inverter to provide an AC output voltage comprising a square wave. In one embodiment, controlling the AC power at the output of the inverter based on the act of determining whether the calculated average output voltage is at least equal to the predetermined average output threshold value includes controlling a pulse width of the square wave at the output of the inverter based on an average output voltage of the square wave at the output of the inverter calculated by the controller over the period of time.

According to one embodiment, the acts of calculating an average output voltage of the inverter over the period of time and calculating an RMS output voltage of the inverter over the period of time are performed at least 64 times in a line cycle. One aspect in accord with the present invention is directed to an uninterruptible power supply (UPS) system comprising an input configured to receive input AC power, an output configured to provide output AC power to a load, a DC power source coupled to a DC bus, an inverter having an input coupled to the DC bus and an output coupled to the output of the UPS system, the inverter configured to receive DC power at the input from the DC bus and provide AC power to the output, and means for controlling the inverter based on average voltage of the AC power at the output of the inverter.

According to one embodiment, the AC power provided by the inverter to the output comprises a square wave. In one embodiment the means for controlling the inverter includes means for controlling a pulse width of the square wave based on average voltage of the square wave at the output of the inverter. In another embodiment, the means for controlling the inverter includes means for controlling the inverter based on average and RMS voltage of the AC power at the output of the inverter.

BRIEF DESCRIPTION OF DRAWINGS

The accompanying drawings are not intended to be drawn to scale, in the drawings, each identical or nearly identical component that is illustrated in various figures is represented by a like numeral. For purposes of clarity, not every component may be labeled in every drawing. In the drawings.

DETAILED DESCRIPTION

Figure 1:
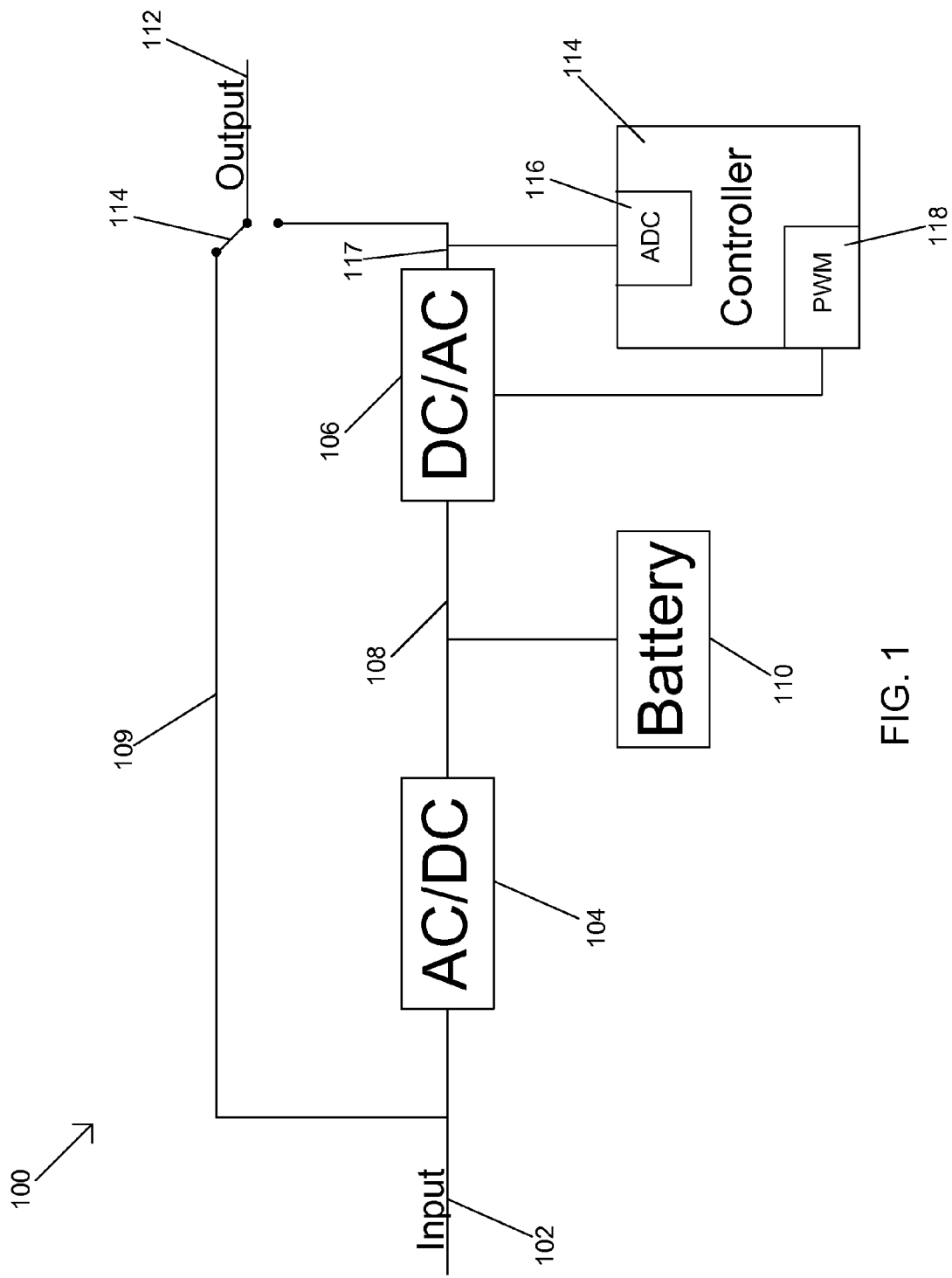
FIG. 1 is a block diagram of an offline uninterruptible power supply according to one aspect of the present invention.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, the use of power devices, such as uninterruptible power supplies (UPS), to provide uninterrupted power for sensitive and/or critical loads, such as computer systems and other data processing systems, is known. At least some backup power devices use an inverter to provide output AC power derived from DC power from a backup power source such as a battery. Depending on the inverter used, the AC power may be more in the form of a square wave than a sine wave. It is becoming more common for loads powered by a UPS to include active Power Factor Correction (PFC) circuitry. Active PFC loads driven by a square wave voltage may become unstable and/or create oscillations on the input power lines. These oscillations may be detected by a UPS powering the load causing the UPS to be powered down and/or potentially causing damage to the UPS.

For example, an active PFC load receiving power from a UPS may include a PFC circuit which includes a PFC pre-regulator that is configured to monitor and control the power being provided to the load in an attempt to provide a unity power factor. Typical PFC circuits control power factor based on the input RMS voltage. However, since the PFC circuit is typically designed for sine wave AC power, and the ratio between the peak value, average value and RMS value of a sine wave is constant, at least some PFC circuits use average voltage or peak voltage in place of RMS to control power factor.

The use of the average voltage or peak voltage by a PFC circuit powered by a UPS works well when the UPS is providing an AC sine wave to the PFC circuit; however, it may cause problems when the UPS is providing a square wave to the PFC circuit. The relationship between the average (Vavg) and RMS (Vrms) of a sine wave and a square wave are shown below:

For a sine wave:

$$V\text{avg}=V\text{rms}*(2\sqrt{2}/\pi)=0.9 V\text{rms} \quad \text{(Equation 1)}$$

For a square wave:

$$V\text{rms}=V\text{peak}*\sqrt{D}, D=\text{Duty ratio} \quad \text{(Equation 2)}$$

$$V\text{avg}=V\text{peak}*D \quad \text{(Equation 3)}$$

$$V\text{avg}=(V\text{rms}^2)/V\text{peak} \quad \text{(Equation 4)}$$

As indicated in Equation 1, with a sine wave, the average input voltage may be an acceptable substitute for the RMS voltage of the UPS as Vavg=0.9 Vrms. However, for a square wave input voltage, the relationship between the RMS voltage and the average or peak voltage varies depending on the duty ratio of the square wave.

It is common in a square wave backup power device (e.g., in a square wave UPS) for the RMS output voltage to be regulated by duty ratio control. The peak output voltage is typically unregulated and can range from 100V to 180V in a 120 Vac power system. The average and peak output voltages of a Vrms-regulated square wave UPS of Vrms=120V at various peak output voltages for different duty cycles is shown in Table 1 (maximum duty ratio=1).

TABLE 1

| Vpeak (V) | 100 | 120 | 130 | 140 | 150 | 160 | 170 | 180 |
|---|---|---|---|---|---|---|---|---|
| D (duty ratio) | 1 | 1 | 0.852 | 0.73 | 0.64 | 0.56 | 0.5 | 0.44 |
| Vavg (V) | 100 | 120 | 110.77 | 102.9 | 96 | 89.6 | 85 | 79.2 |

As the unregulated Vpeak increases, Vavg decreases despite Vrms remaining constant.

The use of the average voltage as the control variable for a PFC circuit may result in excessive overshoot or undershoot of control signals provided by the PFC circuit in response to large line voltage changes by the UPS, and therefore, it may take a relatively long time for the PFC circuit to identify a large line voltage change and respond appropriately. This may result in oscillation of the RMS regulated square wave generated by the UPS. Such oscillations may cause premature overload shutdown of the UPS or high voltage damage to the UPS.

At least some embodiments described herein provide a control system capable of controlling the average output voltage of a square wave power supply, such as a UPS, to prevent potentially damaging oscillations in the power supply as described above.

FIG. 1 is a block diagram of an offline UPS 100 according to one aspect of the present invention. The offline UPS 100 includes an input 102 coupled to a bypass line 109. The bypass line 109 is selectively coupled to an output 112 via a switch 114. According to one embodiment, the output 112 is configured to be coupled to a load having an active PFC circuit. The input 102 is also coupled to an AC/DC converter 104. The AC/DC converter 104 is coupled to a DC/AC inverter 106 via a DC bus 108. A DC power source (e.g., a battery) 110 is coupled to the DC bus 108. The DC/AC inverter 106 is selectively coupled to the output 112 via the switch 114.

A controller 114 is coupled to both the DC/AC inverter 106 and to an output 117 of the DC/AC inverter 106. According to one embodiment, the controller 114 includes an Analog to Digital converter (ADC) 116 coupled to the output 117 of the DC/AC inverter 106 and a Pulse Width Modulation (PWM) controller 118 coupled to the DC/AC inverter 106.

The input 102 is configured to be coupled to an AC power source. When operating in a normal mode of operation, the input 102 is coupled directly to the output 112 via the bypass line 109 and the switch 114. In the normal mode of operation, AC power received at the input 102 is provided directly to the output 112. Also in normal operation, AC power from the input 102 is provided to the AC/DC converter 104 (i.e. a battery charger). The converter 104 converts the AC power into DC power and provides the DC power to the DC bus 108. The DC power on the DC bus 108 is provided to the battery 110 to charge the battery 110.

When operating in a backup mode of operation, the switch 114 couples the output 117 of the inverter 106 to the output 112. In the backup mode of operation, DC power from the battery 110 is provided to the DC bus 108. The DC/AC inverter 106 receives the DC power from the DC bus 108, converts the DC power into AC power, and provides the AC power to the output 117. AC power at the output 117 of the inverter 106 is provided to the output 112 of the UPS 100. According to one embodiment, the AC power provided to the output 117 by the inverter 106 is in the form of a square wave.

The ADC 116 of the controller 114 monitors the output voltage of the inverter 106 at the output 117. Based on the monitored voltage at the output 117, the PWM 118 of the controller 114 operates the inverter 106 to provide the desired voltage at the output 117 of the inverter 106. For example, in one embodiment, based on the monitored voltage at the output 117, the PWM 118 of the controller 114 controls the pulse width of a square wave voltage provided by the inverter 106 to the output 117.

According to one embodiment, based on the monitored voltage at the output 117, the controller 114 is configured to calculate the average output voltage of the UPS 100 over a period of time. The controller 114 compares the calculated average output voltage with a predetermined average voltage threshold value. When the controller 114 determines that the calculated average output voltage is equal to or greater than the predetermined average voltage threshold value, the controller 114 controls the inverter 106 so that the square wave goes to zero (i.e. the output is clamped to zero and the current pulse of the square wave output is terminated).

According to one embodiment, the controller 114 is also configured to calculate the RMS output voltage of the UPS 100 over a period of time to prevent potentially high RMS output voltages from damaging the UPS 100 or load. For example, in one embodiment, the controller 114 compares the calculated RMS output voltage with the predetermined RMS voltage threshold. When the controller 114 determines that the calculated RMS output voltage is equal to or greater than the RMS voltage threshold, the controller 114 controls the inverter 106 so that the square wave goes to zero (i.e. the output is clamped to zero and the current pulse of the square wave output is terminated).

In monitoring and controlling the UPS 100 based on the average output voltage of the UPS 100, rather than solely the RMS output voltage, the controller 114 is able to accurately control the output of the UPS 100 and prevent undershoot and overshoot caused oscillations by more precisely controlling the pulses of the square wave voltage output by the UPS 10 (i.e. turning on and off the inverter 106 at correct times) and provided to an active PFC load. In addition, by also monitoring the RMS output voltage of the UPS 100, potentially damaging high RMS output voltage may be avoided.

Figure 2:
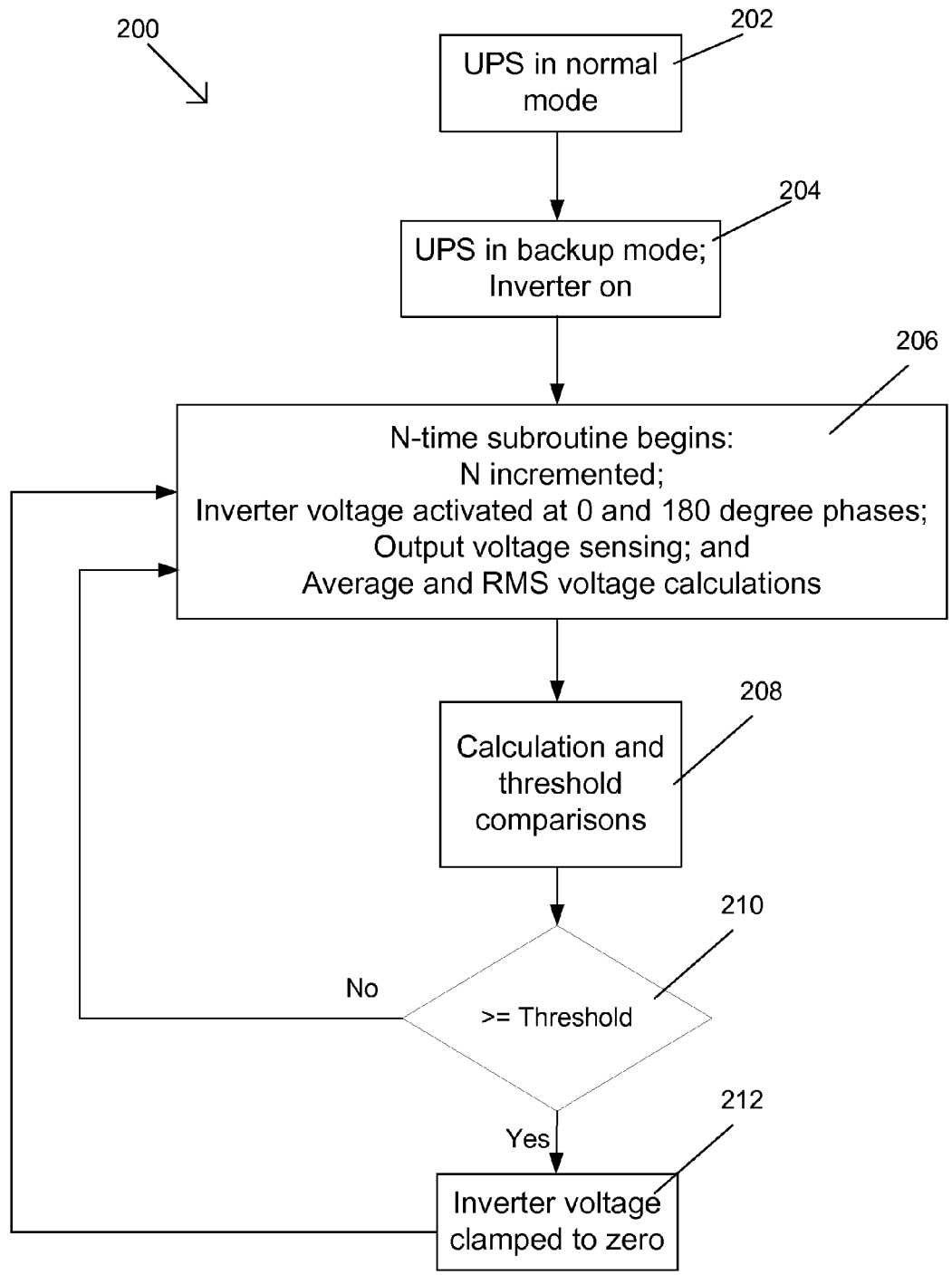
FIG. 2 is a flow chart illustrating a process for controlling an uninterruptible power supply according to one aspect of the present invention.

FIG. 2 is a flow chart 200 illustrating a process for controlling a UPS according to one aspect of the present invention.

At block 202, the UPS 100 is operating in normal mode, the input 102 is coupled directly to the output 112, and the inverter 106 is off. AC power at the input 102 is provided directly to the output 112 and also used to charge the battery 110 via the AC/DC converter 104.

At block 204, the AC power at the input 102 fails and the UPS 100 is switched into backup mode. Upon entering backup mode, the switch 14 is operated to couple the output 112 to the output 117 of the inverter 106. Also upon entering backup mode, the inverter is turned on, receives DC power from the battery 110, converts the DC power into desired AC power and provides AC power to the output 117. According to one embodiment, the AC power at the output 117 is in the form of a square wave.

At block 206, upon the UPS 100 entering backup mode, an N-time subroutine for monitoring the output of the inverter 106 is started in the controller 114. The N-time subroutine is configured to execute N times over a set period of time. For example, in one embodiment, the N-time subroutine is configured to execute N times per every half period of AC line frequency (e.g., 60 Hz) or 8.333 mS. However, in other embodiments, the set period of time may be defined differently. According to one embodiment, N is defined as greater than 64. Therefore, in such an embodiment, the N-time subroutine executes at least 64 times every 8.333 mS. However, in other embodiments, N may be defined as any appropriate value.

At block 206, the output voltage of the inverter 106 is activated at 0 and 180 degree phases. For example, in one embodiment, the square wave output voltage of the inverter 106 is driven positive at the 0 degree phase and is driven negative at the 180 degree phase; however, in other embodiments, the square wave output voltage of the inverter 106 may be defined differently.

Also at block 206, N is incremented, the controller 114 performs inverter output voltage sensing, and the controller 114 also performs inverter output average voltage calculations. According to one embodiment, at block 206 the controller 114 also performs inverter RMS output voltage calculations.

According to one embodiment, inverter output average voltage calculations are performed by summing the instantaneous output voltages of the inverter 106 from N=1 to N. According to one embodiment, inverter RMS output voltage calculations are performed by summing the square of instantaneous output voltages of the inverter 106 from N=1 to N.

At block 208, during the N time subroutine, the controller 114 compares the average voltage calculation with the predetermined average voltage threshold value. According to one embodiment, at block 208 the controller 114 also compares the RMS voltage calculation with the predetermined RMS output voltage threshold value.

At block 210, a determination is made whether either of the average or RMS voltage calculation is equal to or greater than a corresponding predetermined threshold. At block 206, in response to a determination that neither the average voltage calculation nor the RMS voltage calculation is equal to or greater than a predetermined threshold value, N is incremented, the controller 114 continues to monitor the voltage at the output 117, perform average and RMS output voltage calculations and compare the calculations to predetermined threshold values.

At block 212, in response to a determination that one of the average or RMS output voltage calculations is greater than a predetermined threshold value, the output voltage of the inverter 106 is clamped to zero and the current pulse of the square wave output is terminated. At block 206, upon clamping the output voltage to zero, the output voltage is again driven positive or negative (at the next 0 or 180 degree phase) and the controller 114 continues to monitor the voltage at the output 117, perform average and RMS output voltage calculations and compare the calculations to predetermined threshold values.

According to one embodiment, by monitoring the average output voltage, the controller 114 more accurately monitors the output voltage of the inverter 106 and more precisely operates the inverter 106 to provide the correct level of power to the output 112. By more accurately controlling the pulses of a square wave output by the inverter 106 (i.e. turn the inverter 106 off and on at the correct times) oscillations in the UPS 100 caused by overshoot and undershoot of an active PFC load, as described above, may be prevented. In addition, by also monitoring RMS output voltage, potentially damaging high RMS output voltages may be avoided.

For example, the benefit of monitoring the average voltage of an inverter (of a UPS system providing power to a load) may be evident when a mains utility power source which is providing AC power to a UPS system fails (e.g., a utility power blackout or brownout occurs). Typically, when the mains utility power source fails, the UPS system is unable to provide a seamless transfer from utility power to the square wave inverter. In one embodiment, typical power interruption during the transfer from utility to square wave inverter power is six to eight milliseconds. Because the transfer from utility to square wave inverter power is not seamless, to compensate for the power interruption, the current drawn by an active PFC load from the inverter of the UPS system is saturated at its highest level. For example, in one embodiment the current from the inverter in a saturated state is 170% of its rated load. While the inverter is in a saturated state, the output of the inverter follows the peak output voltage curve of a typical square wave inverter of a UPS system operating at full duty cycle.

After the initial surge, it is preferable for the inverter to return to normal operation as quickly as possible to avoid over feeding the load. In at least some embodiments, because the inverter is controlled based on the average output voltage of the inverter, the output of the inverter begins to move towards normal operation almost immediately upon the inverter being taken out of current saturated state. Accordingly, the overfeeding of an active PFC load and resulting oscillations in the UPS system, as described above, may be prevented.

Also as a result of average output voltage control, a pulse output by the inverter controlled based on average output voltage may have a relatively wide pulse width. As such, the inverter does not under feed the load and cause potentially damaging oscillations.

In prior systems using only RMS output voltage control, overfeeding of the load may result in pulses output by the inverter over several output cycles that have relatively short pulse widths and long clamped to zero periods. According to one embodiment, the long clamped to zero periods may appear to an active PFC load as another power interruption which may result in under feeding of the load and again cause the cycling or oscillation of the system.

Therefore, by controlling an inverter of a square wave UPS system based on the average output voltage of the inverter, rather than solely on the RMS output voltage of the inverter, unwanted oscillations in the system based on overfeeding and underfeeding the load may be limited. As described above, in one embodiment, a controller within the UPS system senses and calculates the inverter average output voltage and controls the pulse width of an output square wave to a predetermined output average voltage. In addition, according to another embodiment described herein, a controller also senses and calculates the inverter RMS output voltage and controls the pulse width of the output square wave to a predetermined output RMS voltage to prevent potentially damaging high RMS output voltages.

As described herein, according to one embodiment the UPS system senses and calculates both the inverter average output voltage and the inverter RMS output voltage and controls the pulse width of an output square wave to a predetermined output average voltage and output RMS voltage; however, in another embodiment the UPS system senses and calculates only the inverter average output voltage and controls the pulse width of an output square wave to a predetermined output average voltage.

As described herein, the UPS system 100 is an offline UPS system; however, in other embodiments, the UPS system may be another type of UPS system such as a line interactive UPS system or an online UPS system.

As also described herein, a system and method for controlling the square wave inverter is utilized in a UPS system; however, in other embodiments, the system and method for controlling the square wave inverter is utilized in other types of power systems.

As also described herein, a system and method for controlling a square wave inverter is described herein; however, in other embodiments, other types of inverters with different types of outputs may be controlled.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An uninterruptible power supply (UPS) system comprising:
an input configured to receive input AC power;
an output configured to provide output AC power to a load;
a DC power source coupled to a DC bus;
an inverter having an input coupled to the DC bus and an output coupled to the output of the UPS system, the inverter configured to receive DC power at the input from the DC bus and provide AC power having a voltage to the output; and a controller coupled to the output of the inverter and configured to monitor the voltage at the output of the inverter, calculate an average voltage of the AC power at the output of the inverter over a period of time based on the monitored voltage at the output, and operate the inverter based on the average voltage of the AC power at the output of the inverter.

2. The UPS system of claim 1, wherein the controller is further configured to:
compare the average voltage of the AC power at the output of the inverter with a predetermined average output voltage threshold value; and
control the AC power at the output of the inverter based on the comparison of the calculated average voltage to the average output voltage threshold.

3. The UPS system of claim 2, wherein the controller is further configured to clamp the voltage at the output of the inverter to zero in response to a determination that the calculated average voltage is at least equal to the average output voltage threshold.

4. The UPS system of claim 3, wherein the controller is further configured to:
calculate, based on the monitored output voltage, an RMS voltage of the AC power at the output of the inverter;
compare the RMS voltage of the AC power at the output of the inverter with a predetermined RMS output voltage threshold value; and
control the AC power at the output of the inverter based on the comparison of the calculated RMS voltage to the RMS output voltage threshold.

5. The UPS system of claim 4, wherein the controller is further configured to clamp the voltage at the output of the inverter to zero in response to a determination that the calculated RMS voltage is at least equal to the RMS output voltage threshold.

6. The UPS system of claim 1, wherein the controller includes a pulse width modulation controller coupled to the inverter and wherein the controller is further configured to control the AC power at the output of the inverter using the pulse width modulation controller.

7. The UPS system of claim 6, wherein the AC power provided at the output by the inverter comprises a square wave and wherein the controller is further configured to control a pulse width of the square wave based on an average voltage at the output of the inverter calculated by the controller.

8. The UPS system of claim 1, wherein the UPS system is configured as an off-line UPS.

9. The USP system of claim 1, wherein the UPS system is configured as a line-interactive UPS.

10. A method for controlling an inverter having an output configured to provide AC power, the method comprising:
sampling an output voltage of the AC power at the output of the inverter over a period of time;
calculating, based on the sampled output voltage at the output of the inverter, an average output voltage of the inverter over the period of time;
comparing the calculated average output voltage of the inverter to a predetermined average output threshold value;
determining whether the calculated average output voltage is at least equal to the predetermined average output threshold value; and
controlling the AC power at the output of the inverter based on the act of determining whether the calculated average output voltage is at least equal to the predetermined average output threshold value.

11. The method of claim 10, wherein controlling the AC power at the output of the inverter based on the act of determining whether the calculated average output voltage is at least equal to the predetermined average output threshold value includes clamping the output voltage at the output of the inverter to zero in response to a determination that the calculated average output voltage is at least equal to the predetermined average output threshold value.

12. The method of claim 11, wherein the method further comprises:
calculating an RMS output voltage of the inverter over the period of time;
comparing the calculated RMS output voltage of the inverter to a predetermined RMS output threshold value;
determining whether the calculated RMS output voltage is at least equal to the predetermined RMS output threshold value; and
controlling the AC power at the output of the inverter based on the act of determining whether the calculated RMS output voltage is at least equal to the predetermined RMS output threshold value.

13. The method of claim 12, wherein controlling the AC power at the output of the inverter based on the act of determining whether the calculated RMS output voltage is at least equal to the predetermined RMS output threshold value includes clamping the output voltage at the output of the inverter to zero in response to a determination that the calculated RMS output voltage is at least equal to the predetermined RMS output threshold value.

14. The method of claim 13, wherein controlling the inverter includes controlling the inverter to provide an AC output voltage comprising a square wave.

15. The method of claim 14, wherein controlling the AC power at the output of the inverter based on the act of determining whether the calculated average output voltage is at least equal to the predetermined average output threshold value includes controlling a pulse width of the square wave at the output of the inverter based on an average output voltage of the square wave at the output of the inverter calculated by the controller over the period of time.

16. The method of claim 12, wherein the acts of calculating an average output voltage of the inverter over the period of time and calculating an RMS output voltage of the inverter over the period of time are performed at least 64 times in a line cycle.

17. An uninterruptible power supply (UPS) system comprising:
an input configured to receive input AC power;
an output configured to provide output AC power to a load;
a DC power source coupled to a DC bus;
an inverter having an input coupled to the DC bus and an output coupled to the output of the UPS system, the inverter configured to receive DC power at the input from the DC bus and provide AC power to the output; and
means for monitoring the voltage at the output of the inverter, for calculating an average voltage of the AC power at the output of the inverter over a period of time based on the monitored voltage at the output, and for controlling the inverter based on the average voltage of the AC power at the output of the inverter.

18. The UPS system of claim 17, wherein the AC power provided by the inverter to the output comprises a square wave.

19. The UPS system of claim 18, wherein the means for controlling the inverter includes means for controlling a pulse width of the square wave based on average voltage of the square wave at the output of the inverter.

20. The UPS system of claim 17, wherein the means for controlling the inverter includes means for controlling the inverter based on average and RMS voltage of the AC power at the output of the inverter.

* * * * *